US011984287B2

(12) United States Patent
Gassmann

(10) Patent No.: US 11,984,287 B2
(45) Date of Patent: May 14, 2024

(54) ELECTRIC SWITCH

(71) Applicant: Johnson Electric Germany Gmbh & Co. KG, Dresden (DE)

(72) Inventor: Joerg Gassmann, Dresden (DE)

(73) Assignee: JOHNSON ELECTRIC GERMANY GMBH & CO. KG, Dresden (DE)

( * ) Notice: Subject to any disclaimer, the term of this patent is extended or adjusted under 35 U.S.C. 154(b) by 0 days.

(21) Appl. No.: 17/480,018

(22) Filed: Sep. 20, 2021

(65) Prior Publication Data

US 2022/0005664 A1 Jan. 6, 2022

Related U.S. Application Data

(63) Continuation of application No. PCT/EP2020/057792, filed on Mar. 20, 2020.

(30) Foreign Application Priority Data

Mar. 21, 2019 (DE) ........................ 102019107223.9

(51) Int. Cl.

| | |
|---|---|
| ***H01H 89/00*** | (2006.01) |
| ***H01H 23/04*** | (2006.01) |
| ***H01H 23/16*** | (2006.01) |
| ***H01H 50/44*** | (2006.01) |
| ***H01H 50/54*** | (2006.01) |

(52) U.S. Cl.

CPC ............ *H01H 89/00* (2013.01); *H01H 23/04* (2013.01); *H01H 23/16* (2013.01); *H01H 50/44* (2013.01); *H01H 50/54* (2013.01)

(58) Field of Classification Search

CPC ........................ H01H 47/226; H01H 33/6662

USPC ................................ 335/128, 191, 205, 234

See application file for complete search history.

(56) References Cited

U.S. PATENT DOCUMENTS 3,165,604 A * 1/1965 Sorenson .............. H01H 23/28 200/557
3,225,153 A * 12/1965 Carling .................... H01H 9/26 200/437
4,150,350 A * 4/1979 Fong ................. H01H 36/0073 335/206
4,337,450 A * 6/1982 Matthies ............... H01H 23/00 337/66
5,510,583 A * 4/1996 Pescetto .............. H01H 23/003 200/1 B (Continued)

FOREIGN PATENT DOCUMENTS

CN 107146743 A 9/2017
DE 202004005553 U1 6/2004

(Continued)

OTHER PUBLICATIONS

International Search Report from corresponding PCT application No. PCT/EP2020/057792 dated May 12, 2020.

(Continued)

*Primary Examiner* — Alexander Talpalatski
(74) *Attorney, Agent, or Firm* — Aird & McBurney LP

(57) ABSTRACT

The invention relates to an electric switch that serves to switch on and/or off electric devices and for this purpose has a contact system in the switch housing. By means of a manual actuating element or a remotely controlled actuator, a switching operation can be effected.

14 Claims, 5 Drawing Sheets

(56) References Cited

U.S. PATENT DOCUMENTS

| | | | | |
|---|---|---|---|---|
| 5,525,948 | A * | 6/1996 | Poulsen | H01H 3/503 335/78 |
| 7,233,220 | B2 * | 6/2007 | Batteux | H01H 51/01 335/229 |
| 7,978,037 | B2 * | 7/2011 | Yamada | H01H 36/008 335/207 |
| 10,319,547 | B2 * | 6/2019 | Maier | H01H 50/643 |
| 2003/0214375 | A1 | 11/2003 | Sugano et al. | |
| 2008/0258853 | A1 * | 10/2008 | Yamada | B60Q 1/441 335/205 |
| 2014/0062623 | A1 * | 3/2014 | Fasano | H01H 71/24 335/15 |

FOREIGN PATENT DOCUMENTS

| | | | |
|---|---|---|---|
| DE | 102016101016 | A1 | 7/2017 |
| DE | 102016109486 | B3 | 9/2017 |
| JP | S5514204 | U | 1/1980 |
| JP | H01103135 | U | 7/1989 |
| JP | 2000133091 | A | 5/2000 |
| JP | 3202095 | U | 1/2016 |

OTHER PUBLICATIONS

Written Opinion from corresponding PCT application No. PCT/EP2020/057792 dated May 12, 2020.

English Translation of DE 102016101016 from Google Patents dated Dec. 30, 2021.

English Translation of DE 202004005553 from Google Patents dated Dec. 30, 2021.

English Translation of DE 102016109486 from Google Patents dated Dec. 30, 2021.

JP Application No. 2021-556733, Office Action, Japanese Patent Office Mar. 28, 2024.

JP Application No. 2021-556733, English Machine Translation of Office Action.

* cited by examiner

ELECTRIC SWITCH

CROSS REFERENCE TO RELATED APPLICATIONS

This non-provisional patent application is a continuation application of PCT Application No. PCT/EP2020/057792, filed with the European Patent Office on Mar. 20, 2020, which claims priority to German Patent Application No. 10 2019 107 223.9, filed on Mar. 21, 2019, all of which are incorporated herein by reference in their entirety.

TECHNICAL FIELD

The present invention relates to an electric switch, preferably a switch that can be operated manually and remotely in both switching positions.

BACKGROUND

Electric switches are used to switch electric devices on and/or off and have a contact system in the switch housing for this purpose. By means of a manual actuating element, e.g. a rocker or a slider, a switching operation can be effected. The position of the rocker or slider indicates the switch on or off position.

From documents DE 198 02 332 B4 and DE 10 2013 008 128 A1, solutions are also known that move the rocker by means of a controllable actuator that is actively connected to the actuating element. However, such a switching of the contact system is only effected in one switching position. Furthermore, this rocker switch does not behave identically when manually switched on and off. However, rocker switches with a uniform haptic for the on and off switching process are desired.

Furthermore, the integration of electric devices into a global infrastructure (Internet of Things) requires that devices are networked with each other. For such a system (IOT), it is a prerequisite that a rocker switch can be controlled by an actuator in both switching positions of the actuating element. This requires actuators that can actively generate movements in both directions, which is not possible with the aforementioned actuator. Such remote controlled rocker switches are described in the two documents DE 10 2016 101 016 and DE 10 2016 101 017.

SUMMARY

The object of the present invention is to provide a switch that can be operated manually and remotely in both switching positions, whereby both switching operations are effected equally, namely with the same switching force and the same switching haptic.

For manual operation, the new electric switch has an actuating element, such as a rocker or a slider, which is movably mounted and can assume two different operating positions. A contact system with at least one moving contact and at least one fixed contact is arranged in the housing. From these contacts, electric connections lead out of the housing. The actuating element is not directly connected to the moving contact. For the transmission of the manual movement upon actuation of the actuating element to the contact element holding the moving contact, a transmission mechanism is provided that interacts on the one hand with the actuating element and on the other hand with the moving contact in order to close a load circuit in its actuating position, which corresponds to a switch position, for example the switch-on position, and to interrupt the load circuit in its other actuating position, which corresponds to the other switch position, namely the switch-off position.

Here, switching from one to the other switching position is possible by remote control in addition to the manual operation of the actuating element described above. This remotely controlled switching is effected in an inventive manner by means of a bistable electromechanical actuator, which is arranged in the housing of the switch. The actuator has an e-shaped magnetic circuit consisting of two yoke halves, which are fitted with a permanent magnet in the middle.

In one version, the switch has a rocker as the actuating element. The transmission mechanism is a pivoting control lever on the actuator, which engages with its driving head in a slot guide arranged on the rocker below its pivot axis. Instead of this direct coupling, an indirect coupling by means of intermediate elements for adapting the transmission ratio is also possible. This control lever or member is also directly or indirectly connected to a contact spring fitted with the moving contact. The pivoting control lever has two arms. Depending on the pivoting position of the control lever, one arm touches the bistable actuator and forms a closed magnetic circuit through the contact. The permanent magnet generates a permanent magnetic flux and thus provides a self-retaining switching position of the control lever. This switching position can be cancelled by generating a further magnetic field. For this purpose, an excitation winding is arranged on both sides of the actuator. An electromagnetic flux can be generated by energising the excitation windings. The excitation windings are wound in such a way that an electromagnetic flux is generated during this energisation, which is oriented in the opposite direction to the permanent magnetic flux, so that this closed magnetic circuit is extinguished in one half of the yoke and the arm of the control lever is no longer attracted. The magnetic flux always present in the other half of the yoke exerts an attraction on the other arm of the control lever, causing the pivoting control lever to pivot. This is advantageously supported by the contact spring coupled to the control lever, which is designed in such a way that it generates forces in the respective contact position that support the switching.

In another version of the switch, manual operation is by means of a slider which interacts with the pivoting control lever on the bistable actuator. In the same way, a pivoting control lever on the actuator is provided as a transmission mechanism, which engages with its driving head in a receptacle on the slider. Instead of this direct coupling, indirect coupling is also possible. The control lever is also connected directly or indirectly to the contact spring.

In another version, the switch comprises a housing, and at least two electric contacts in the interior of the housing, each electric contact led out of the housing as electric connections, one contact being designed as a fixed contact and the other as a moving contact. The new electrical switch comprises an actuating assembly having two different actuating positions which correspond to two different switching positions, and further comprises a bistable actuator for remote control is integrated in the housing of the switch, wherein the actuating assembly interacts directly or indirectly with a control member of the bistable actuator, the actuating assembly, the control member of the bistable actuator and the movable electric contact are forcibly coupled to one another such that the new electric switch can be remotely switched from one switching position to the other.

The heart of the new electric switch is the bistable actuator with the two yoke halves and the permanent magnet. In the passive states of the excitation coils, i.e. when these coils are not energised, the permanent magnetic flux holds an arm of the control lever on the actuator and pulls it stably onto the respective yoke. Depending on which arm is held on the actuator, the actuating element indicates the switch-on or switch-off position, i.e. due to its active connection with the control lever, e.g. via the switch head in the slot guide of the rocker.

In order to support the switching of the bistable magnetic actuator, the contact spring is advantageously designed in such a way that it generates preload forces in the direction of the other switching position in the end positions of the actuator.

The control lever, on the other hand, acts on the contact spring with the moving contact. In particular, in one embodiment of the invention, it is provided that one arm of the control lever is extended beyond its point of contact with the actuator and is coupled at this end to a transmission element which is connected to the contact spring. In this way, the contact spring with the moving contact is pressed against the fixed contact in one pivoted position of the control lever and pulled away from this fixed contact in the other pivoted position of the control lever. The contact spring is designed in such a way that a spring tongue is exposed as the carrier of the moving contact. By releasing the spring tongue, this contact spring can continue to move even after the contact has closed and generates a so-called overstroke. This generates a suitable contact force when the contact is closed.

To switch the contact system, manual operation by means of the rocker or the slide is possible on the one hand, which, via its active connection with the control lever, causes a pivoting movement of the control lever and thus a switching of the contact system. On the other hand, for remote control of the switch, one or both coils are activated depending on the circuitry, whereby the respective closed permanent magnetic circuit is extinguished and at the other yoke a permanent magnetic bypass attracts the arm of the control lever, which means that the control lever is pivoted. After the coil is disconnected from its control voltage, this now fully closed permanent magnetic circuit also causes the attracted control lever to be held and thus the new switching position to be maintained.

The new electric switch allows both the integration of an electric device into an "Internet of Things" system and can be switched remotely. Here it is ensured that this actuation is also visible with the position of the actuating element during remote control, since the rocker or the slider changes its actuating position even if the actuator is remotely controlled. In addition, the new electric switch can be operated simultaneously in the usual manual manner. Both remote controlled and manual switching functions are carried out in the same way, and when the rocker, for example, is operated manually, they have a pleasant haptic. This is effected by the equivalent movement behaviour of the bistable actuator during both switching operations, both when switching off and when switching on. In particular, a precise switching point can be generated in both directions of actuation, and sensed during manual actuation. It depicts a high energy spectrum and high holding forces, so that the entire electric switch can be highly miniaturised.

All movable components of the switch, namely the actuating element, control lever, contact spring, are positively coupled to switch the contact system, and movement of one of these components results in movement of the other components. This allows a clear recognition of the switching state from the outside, namely at the actuating position of the actuating element. The bistable electromechanical actuator ensures that the system can only assume two defined states.

BRIEF DESCRIPTION OF THE DRAWINGS

The invention will subsequently be described in greater deal by way of an embodiment.

DETAILED DESCRIPTION OF THE EMBODIMENTS

Figure 1:
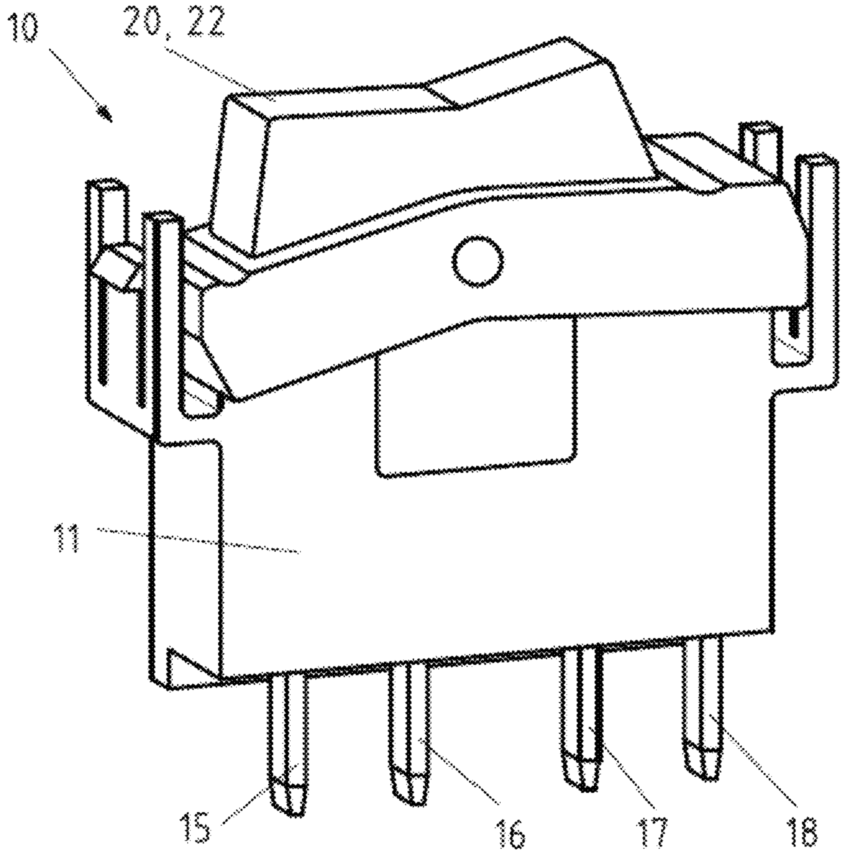
FIG. 1 shows a perspective view of an electric rocker switch.

FIG. 1 shows a version of the electric switch 10 as a rocker switch with its housing 11. The manual actuating element 20, i.e. the rocker 22, is mounted on the housing 11 and can pivot. This rocker 22 has different actuation positions, namely in one actuation position, shown in FIG. 4, this corresponds to the on position of switch 10 and in the other position this corresponds to the off position of the switch, see FIG. 2. Four electric connections 15, 16, 17, 18 protrude from the housing 11. The electric connections 17, 18 are control connections for the bistable actuator 30. The electric connection 15 is connected to the contact spring 40 via the printed circuit board 19, as can be seen better from FIG. 2, where the switch 10 is shown without housing. The contact spring 40 holds the moving contact 41 at the end of a spring tongue 42. The electric connection 16 is connected to the fixed contact 61.

Figure 2:
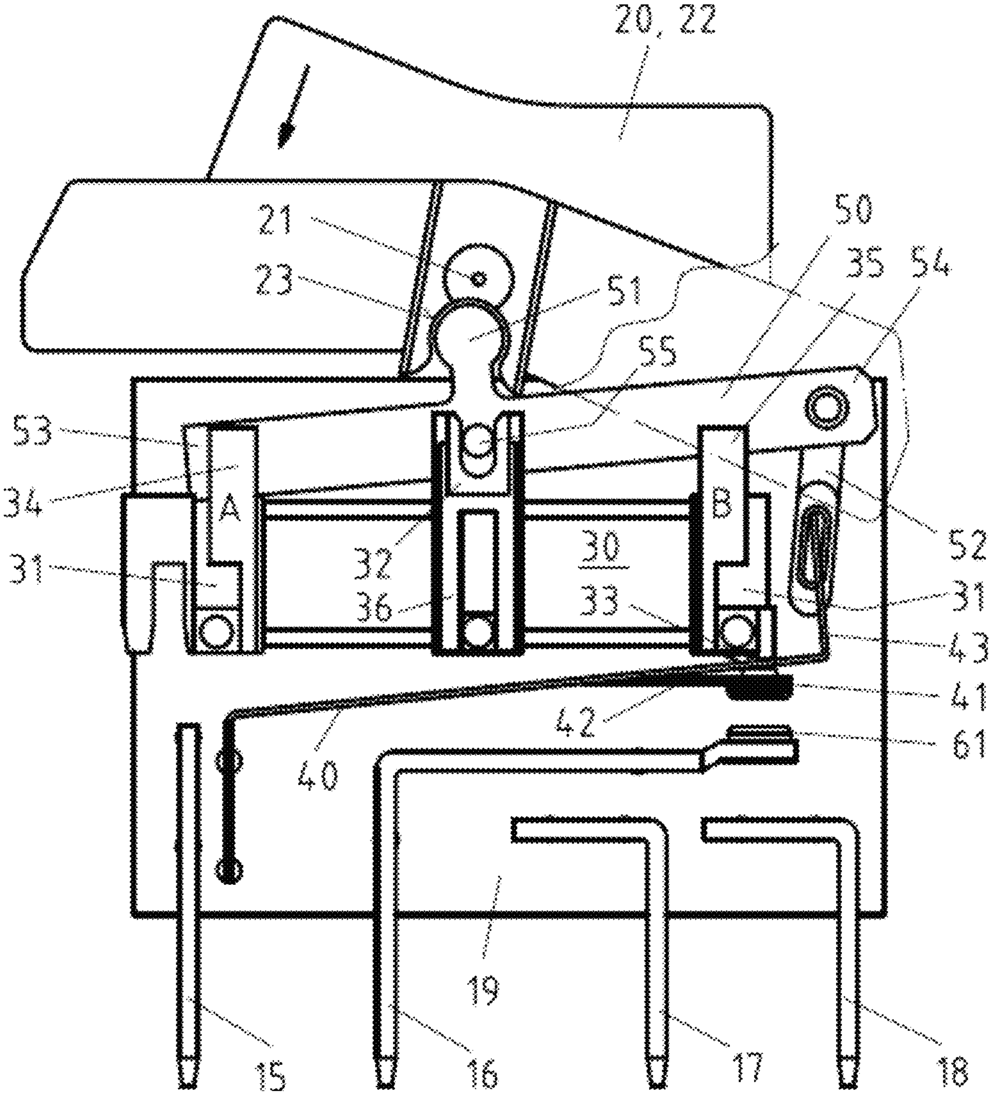
FIG. 2 shows a side view of the rocker switch without housing in the off position.

The electric switch 10 is shown in FIG. 2 in the off position and can be moved to the on position by manually operating the rocker 22 in the direction of the arrow. The rocker 22 pivots around the pivot axis 21. Below this pivot axis 21 there is a slot guide 23 fitted to the rocker 22. A driving head 51 of a control lever or member 50 engages in this slot guide 23. If the rocker 22 is operated, the position of the driving head 51 is changed via the slot guide 23, which causes the control lever or member 50 to pivot. In this design example, this control lever 50 is pivotably mounted on the bistable actuator 30. The pivot axis 55 is located below the driving head 51. The control lever 50 has two arms 53, 54. The extended arm 54 is coupled with a transmission element 52. An angled arm 43 of the contact spring 40 engages in this transmission element 52, so that the operation of the rocker 22 causes the control lever 50 to pivot and the contact spring 40 to be lowered. This results in contacting as the moving contact 41 is pressed onto the fixed contact 61.

The manual switching operation described above can be effected in the same way by remote control, as the control lever 50 is not only actively connected with the rocker 22, but also with a bistable electromechanical actuator 30. This actuator 30 is arranged in the housing 11 and has a permanent magnet 32 in the middle between two yoke halves 34, 35 holding a centre leg 36. In this way, an e-shaped magnetic core is created. On both sides of the actuator 30, there is an excitation winding 31. In the passive states, i.e. when the excitation windings 31 are not activated and thus do not generate an additional magnetic field, the permanent magnet

32 holds an arm 53, 54 of the control lever 50. In FIG. 2 this is the arm 53. In the shown left half of the actuator 30, a closed permanent magnetic circuit A is present by touching the arm 53 of the control lever 50, whereby a permanent magnetic flux flows via the permanent magnet 32, the centre leg 36, the yoke 34 and the arm 53. This permanent magnetic flux, fed by the permanent magnet 32, pulls the arm 53 on the actuator 30 steadily onto the yoke 34. In this position of the control lever 50, shown in FIG. 2, the contact spring 40 is pulled upwards via the transmission element 52 and the contact 41 is at a distance from the fixed contact 61. In this manually or remotely controlled switch-off position, the control lever 50 is tilted to the left and the rocker 22 tilted to the right, as shown in FIG. 2.

Figure 4:
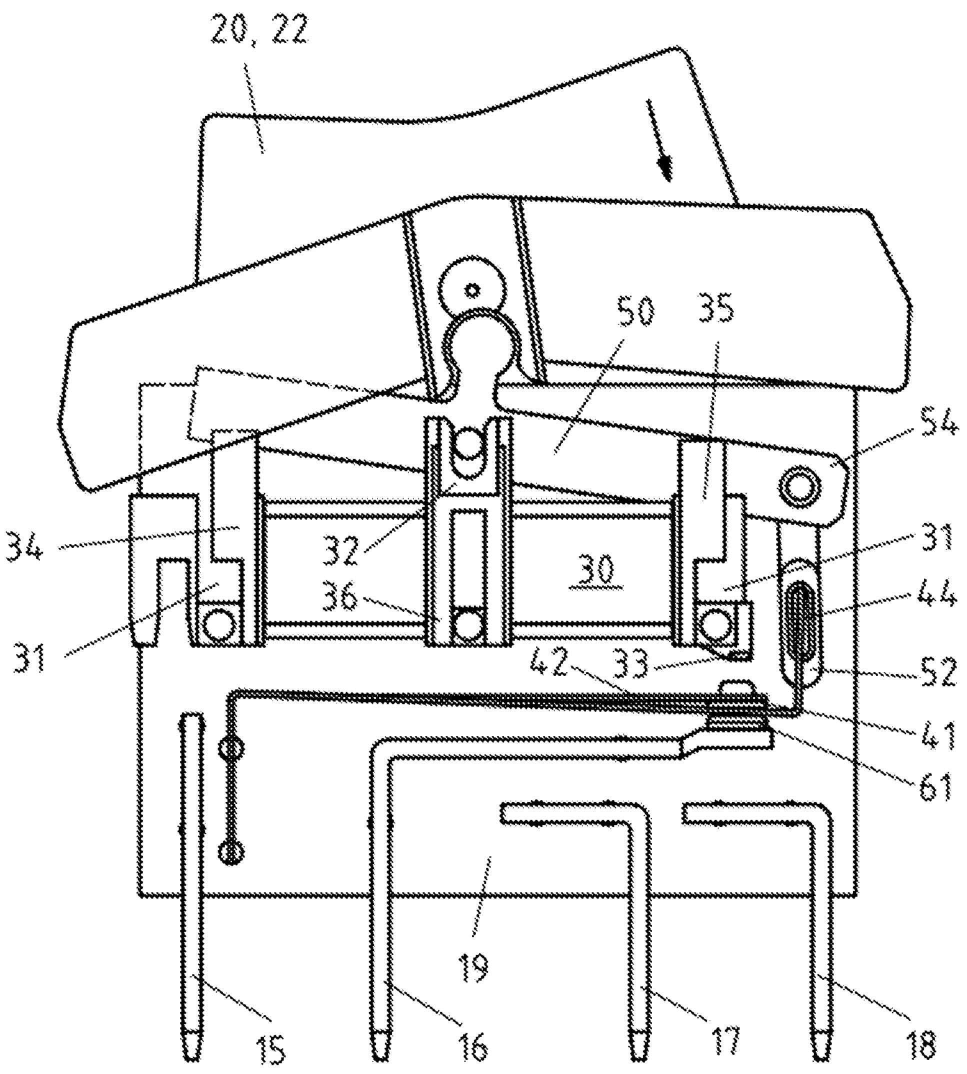
FIG. 4 shows a side view of the rocker switch without housing in the on position.

If a coil 31 is now activated, in this case the excitation winding 31 at the yoke 34, then the magnetic circuit A in the yoke 34 is cancelled, since the magnetic field of the coil 31 is opposed to the magnetic flux A. The magnetic flux A generated by the permanent magnet is displaced from the left parallel circuit into the right parallel circuit B. This exerts a magnetic attraction on the arm 54 of the control lever 50, which causes the control lever 50 to pivot to the right, closing the gap at the yoke 35. If the control voltage is disconnected from the coil 31 at yoke 34, the arm 54 remains at actuator 30. Due to its permanent magnetic field B, the permanent magnet 32 produces a magnetic force that holds the arm 54. This position is shown in FIG. 4. With the lowered arm 54, the transmission element 52 is also lowered, which moves the arm 43 of the contact spring 40. By lowering the contact spring 40, a contact between the moving contact 41 and the fixed contact 61 is established. In this manually or remotely controlled switch-on position, control lever 50 in this example is tilted to the right and rocker 22 is tilted to the left. The rocker 22 can be operated in the direction of the arrow to open the contact. In the same way, the excitation winding 31 adjacent to the yoke 35 can be excited to cause this switching process by generating a magnetic field.

Figure 3:
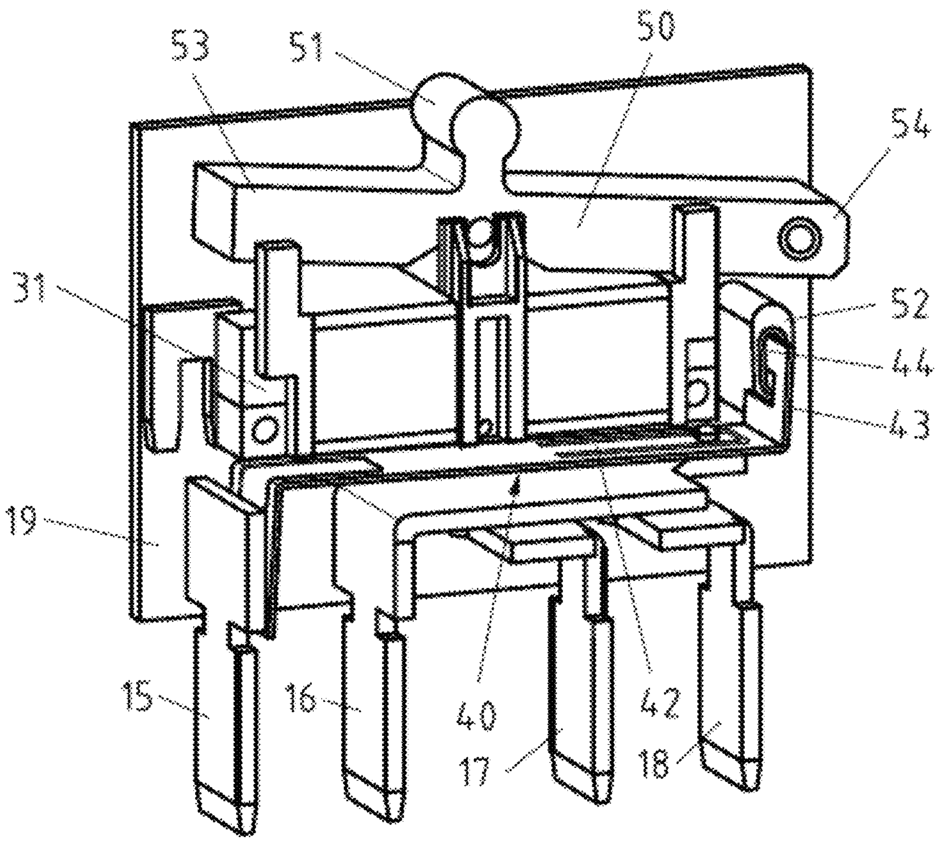
FIG. 3 shows a perspective view of the rocker switch without housing and rocker.

The moving contact 41 is provided from a contact spring 40, as shown in FIGS. 2 to 4. The shape of contact spring 40 is best shown in the perspective view of FIG. 3. It is designed in such a way that a spring tongue 42 as the carrier of the moving contact 41 is exposed. In this example, one end of the contact spring 40 is connected to the electric connection 15 via the printed circuit board 19 and is firmly clamped at this end. The other end of the contact spring 40 is angled to an arm 43, which has an engagement end 44 that engages in the transmission element 52. This transmission element 52 is coupled to the control lever 50, so that a pivoting movement of the control lever 50 causes the contact spring 40 to be lowered or raised. Due to the release of the spring tongue 42, when the contact spring 40 is lowered, this contact spring 40 can also move further downwards after the contact has closed and generates a so-called overstroke, see FIG. 4. This generates a suitable contact force when the contact is closed. In the switch-off position, shown in FIG. 2, the end of the spring tongue 42 rests against a stop 33. Here too, the movement of the contact spring 40 is not blocked, but the resulting stop forces support the start of the switching movement. The shown contact spring 40 has the advantage that due to the release of the spring tongue 42, the contact 41 safely contacts the fixed contact 61, even if the end position of the contact spring 40 varies due to manufacturing and assembly tolerances. In addition, undesirable contact bounce is suppressed.

The contact spring 40 can have several exposed spring tongues 42 with contacts 41, which interact accordingly with several counter contacts 61, i.e. the contact system comprises several pairs of contacts 41, 61. In this way, contact bounce can be additionally minimised and the current carrying capacity or switching capacity can be increased for the same installation space of switch 10.

In addition, a defined spring force can be provided to the bistable actuator 30 in the on position as well as in the off position, so that the start of the switching movement is supported and a faster and safer switching takes place. It should be noted that the control lever 50 can be substituted for a control member with any other shapes in other embodiments.

With a further version of a switch 10, another contact can be provided instead of the previously described stop 33 to form a changeover switch.

Figure 5:
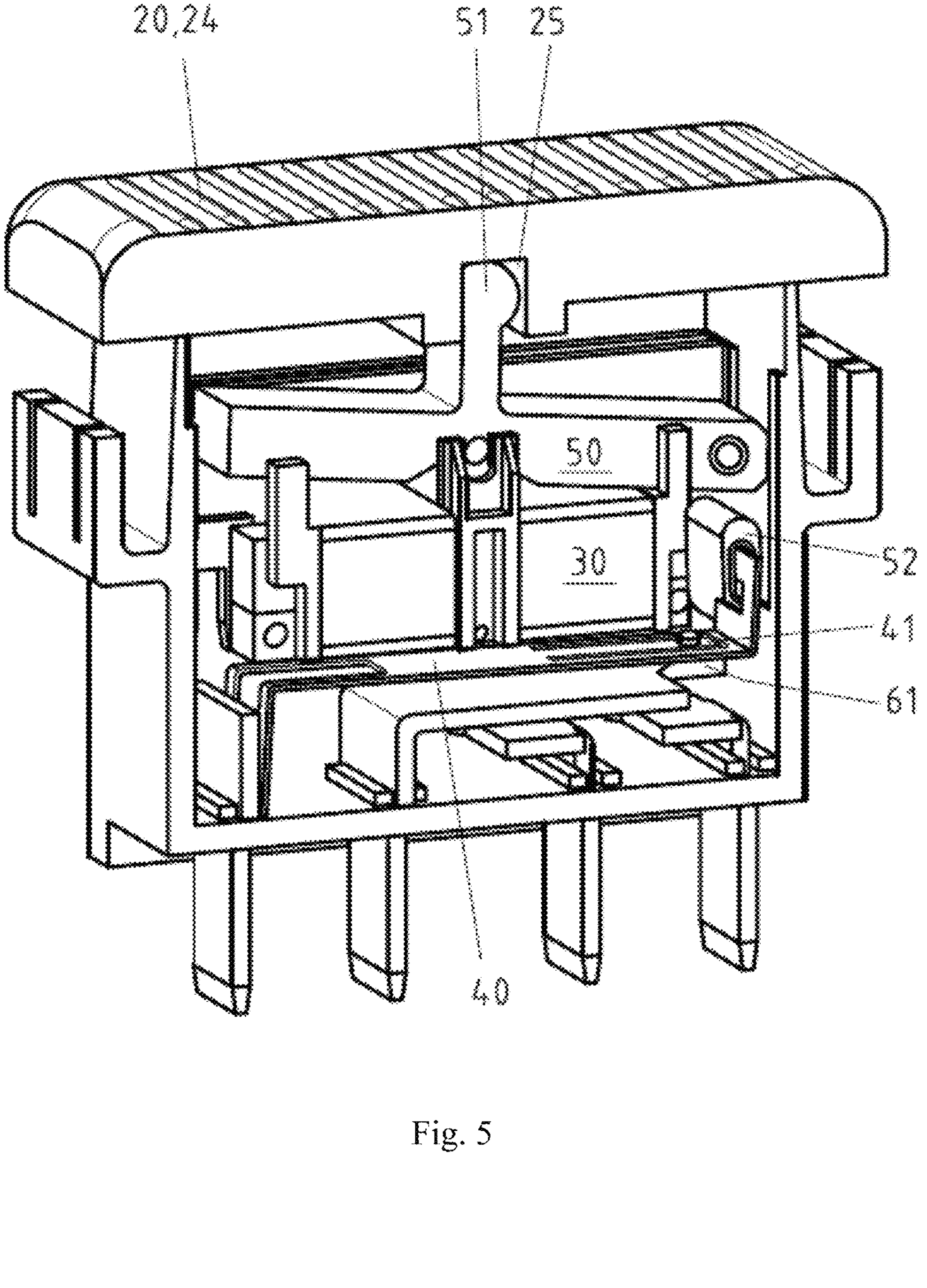
FIG. 5 shows a perspective view of a slide switch without housing.

FIG. 5 shows a further version of a switch 10' according to the invention, here without housing. The manual control element 20 is a slide 24. The further structure of switch 10' corresponds to the structure of the rocker switch 10 described above. Slide 24 has a receptacle 25 on its underside for the driving head 51 of the control lever 50 mounted on the bistable actuator 30. When the slide 24 is actuated, the position of the driving head 51 changes, causing the control lever 50 to pivot and the contact spring 40 to be lowered or raised in the same way as with rocker switch 10.

The invention is not limited to the design examples shown. Switches 10, 10' may contain further electronic elements that provide illumination, communication, time control or acoustic signals.

The invention claimed is:

1. An electric switch comprising:

a housing;

a manual actuating element, wherein the actuating element is movably mounted and configured to have two different actuating positions which correspond to two different switching positions;

at least two electric contacts in the housing, each electric contact led out of the housing as electric connections, one contact being designed as a fixed contact and the other as a moving contact;

wherein a bistable actuator for remote control is integrated in the housing of the switch; the actuating element interacts directly or indirectly with a control lever of the bistable actuator; the actuating element, the control lever of the bistable actuator, and the movable electric contact are forcibly coupled to one another;

wherein the bistable actuator holds a permanent magnet between two yoke halves, wherein, through contact of the actuator with an arm of the control lever, the permanent magnet generates a closed magnetic circuit with magnetic flux generated by the permanent magnet for enabling a self-holding position of the control lever, wherein on both sides of the actuator there is a respective excitation winding which, when energised, generates an electromagnetic magnetic flux whose direction is opposite to the direction of the permanent magnetic flux;

wherein the control lever comprises a driving head engaged with the actuating element, the control lever is pivotally connected to the bistable actuator, and forced to be pivoted by an interaction between the driving head and the actuating element in response to an operation of the actuating element, or energization of the excitation windings to generate an electromagnetic magnetic flux acting on the control lever.

2. The switch according to claim 1, wherein the position of the control lever is switched over by the generation of an electromagnetic flux in the yoke half of the actuator, which contacts an arm of the control lever, even without the electromagnetic flux, an arm of the control lever is held on the actuator in each position by a closed permanent magnetic circuit.

3. The switch according to claim 1, wherein electric connections are provided for activating the excitation windings, which are connected to a printed circuit board arranged in the housing.

4. The switch according to claim 1, wherein an arm of the control lever is extended beyond its point of contact with the actuator and the control lever is coupled on this arm to a transmission element connected to the moving contact.

5. The switch according to claim 1, wherein the moving contact is supported by a contact spring, wherein an engagement end of an angled arm of the contact spring engages a transmission element connected to the moving contact and the other end of the contact spring is connected to the printed circuit board or directly to a terminal.

6. The switch according to claim 5, wherein the contact on the contact spring is arranged on a free end of a spring tongue.

7. The switch according to claim 6, wherein in the open position, the spring tongue is held spread apart by the contact spring, namely spread apart in the direction of the fixed contact with the spreading being effected by a stop on the actuator.

8. The switch according to claim 6, wherein in the switched-on position, the contact spring is held spread apart by the spring tongue, with the spreading being effected by the fixed contact and thus this overstroke increases the contact pressure.

9. The switch according to claim 7, wherein a further contact is provided as a fixed contact in the housing, for the function of a changeover switch, the further fixed contact replacing the stop of the actuator and the spring tongue having a contact on both sides.

10. The switch according to claim 1, wherein the actuating element is a rocker which has a slot guide below its pivot axis, in which the driving head of the pivotable control lever engages, wherein the rocker is coupled to the control lever via the slot guide in such a way that two defined switching positions and two uniquely assigned positions of the rocker result from the two possible stable positions of the control lever when the yoke is closed.

11. The switch according to claim 10, wherein a pivot axis for the control lever is located below the driving head and above the actuator.

12. The switch according to claim 1, wherein the actuating element is a slide, with the slide having a receptacle for the driving head of the control lever.

13. The switch according to claim 1, wherein one position of the actuating element indicates the on position and the other position of the actuating element indicates the off position, irrespective of whether manual or remote controlled switching has been effected.

14. The switch according to claim 1, wherein further electronic control or display elements are arranged in or on the housing.

* * * * *